F. B. WOMACK.
DIRECTION SIGNAL FOR AUTOMOBILES.
APPLICATION FILED JULY 19, 1921.

1,406,130.

Patented Feb. 7, 1922.

F. B. Womack
INVENTOR

BY Victor J. Evans
ATTORNEY

L. B. James
Thomas E. Turpin
WITNESS:

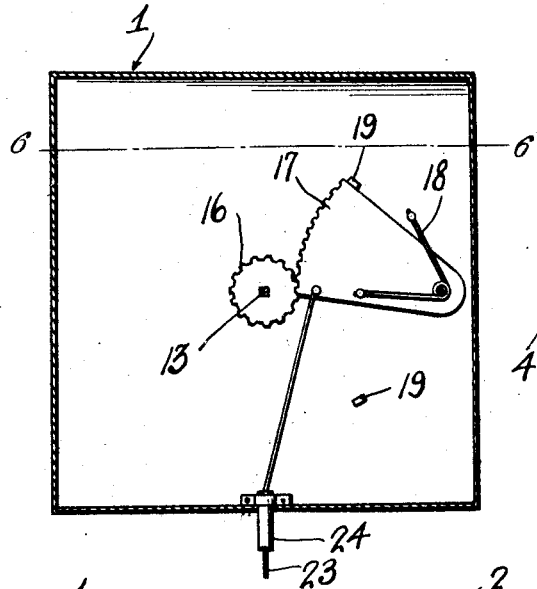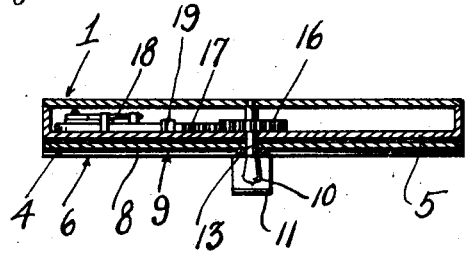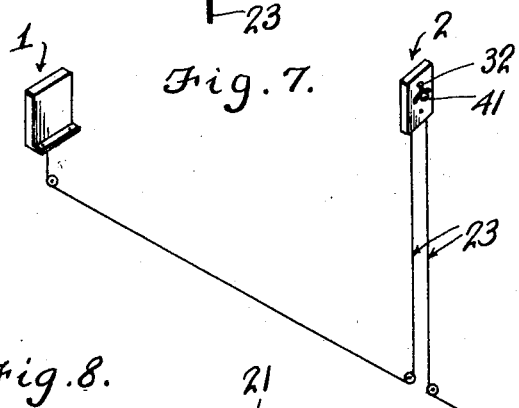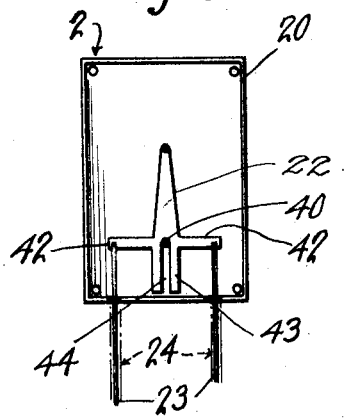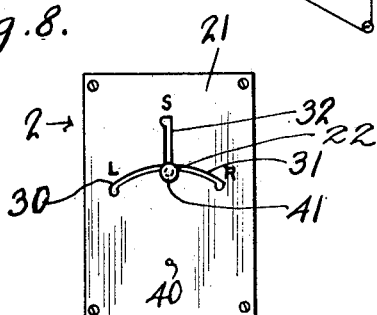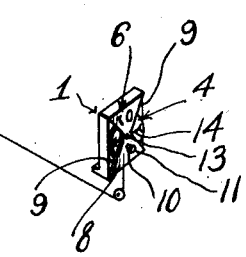

UNITED STATES PATENT OFFICE.

FOSTER B. WOMACK, OF PORT ARTHUR, TEXAS.

DIRECTION SIGNAL FOR AUTOMOBILES.

1,406,130.  Specification of Letters Patent.  Patented Feb. 7, 1922.

Application filed July 19, 1921. Serial No. 485,907.

*To all whom it may concern:*

Be it known that I, FOSTER B. WOMACK, a citizen of the United States, residing at Port Arthur, in the county of Jefferson and State of Texas, have invented new and useful Improvements in Direction Signals for Automobiles, of which the following is a specification.

The object of my present invention is the provision of a direction signal for automobiles, characterized by simplicity in construction, reliability in action and the facility with which it may be actuated quickly and in a natural manner by the automobile driver.

Other objects and practical advantages of the invention will be fully understood from the following description and claims when the same are read in connection with the drawings, forming part of this specification, in which:—

Figure 5 is a view illustrating the interior construction of the signal.

Figure 6 is a cross section of the signal taken in the plane indicated by the line 6—6 of Figure 5.

Figure 7 is a view illustrating the signal as properly arranged relatively to the manually operated control means.

Figures 8 and 9 are detail views of the control means.

Similar numerals of reference designate corresponding parts in all of the views of the drawings.

In the illustrated embodiment of my invention the direction signal as a whole is designated by 1, and the control means as a whole is designated by 2.

Figure 1:
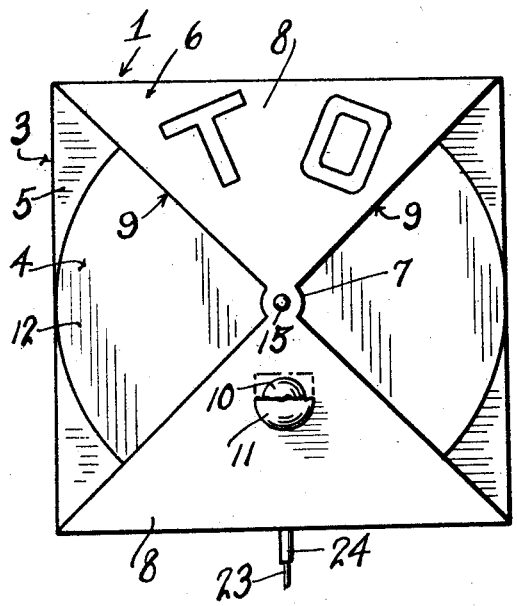
Figures 1, 2, 3 and 4 are elevations of my novel signal with the signal member in different positions; the said signal member being in natural position in Figure 1, in position to indicate a turn to the left in Figure 2, in position to indicate a turn to the right in Figure 3 and in a position to indicate a stop in Figure 4.
Figure 2:
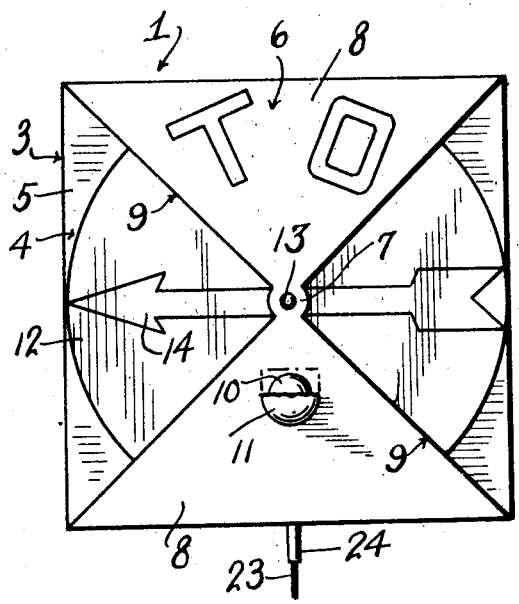
Figure 3:
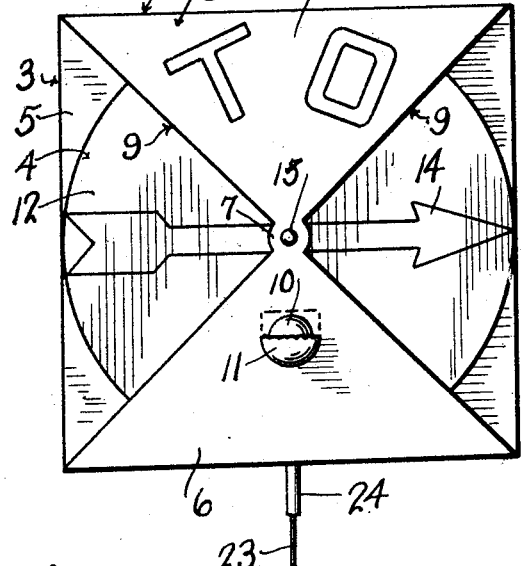
Figure 4:
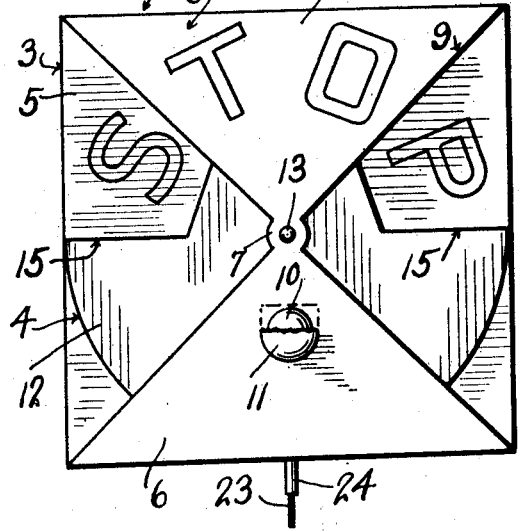

By particular reference to Figures 1 to 6 it will be understood that the signal 1 includes an appropriate body 3 and a rotatable indicating member 4. The body 3 comprises a plate 5, preferably of appropriate metal, and face plates 6 fixed with respect to and arranged at opposite sides of the plate 5. Each of the face plates 6 has a central portion 7 and upper and lower portions 8 of general triangle form so that recesses or open faces 9 are afforded between the portions 8 at opposite sides of the central portion 7. It will also be observed that the lower of face plates 6 is provided with an incandescent electric lamp 10, located below its center and preferably arranged relatively to a shade 11 so as to enable the shade to assure adequate illumination of the adjacent signal face. The face plate 6 is also provided above its center with the letters "TO." The lamps 10 are preferably arranged in the tail light circuit of the automobile so that the said lamps 10 will be caused to glow whenever the tail light (not shown) is in use. Arranged at the inner sides of the face plates 6 are the rotatable indicating members 12 of the improvement. Each of the said indicating members 12 is fixed on a shaft 13, and each is provided on its outer side with representation of an arrow 14 and is also provided with peripheral notches 15. At this point I would have it understood that the body portions 3 are provided at proper points with the letters S and P, the said letters S and P being adapted to be exposed by the notches 15 in the members 12 so as to serve in conjunction with the letters "TO" to form the general "STOP" at opposite sides of the signal. I would also have it understood that in the preferred embodiment of my invention the letters forming the words "STOP" are printed in white on an arcuate line, and that the back grounds of the circles containing the said arcuate lines are colored red so as to make more prominent the front and rear words "STOP" when the same are displayed. In this connection it will be understood that the two groups of letters "TO" are always displayed, and that therefore that will serve to attract attention and will make more prominent the complete words "STOP" when the indicating members 12 are positioned for the display of the words "STOP."

Also fixed to the shaft 13 is a gear 16, and intermeshed with the gear 16 is a swinging gear sector 17 that is subject to the action of a spring 18 and is movable between stops 19.

The control means 2 of my improvement may be and preferably is made up of a body 20, a cover plate 21, a movable member 22, and fine wire cables 23 interposed between and connecting the movable member 22 and the gear sector 17.

The signal 1 is designed and adapted to be appropriately fixed on one of the rear fenders of an automobile, and the control means 2 may be located on the steering, the instrument board or any other appropriate part of the automobile; the connecting wires 23 being preferably enclosed in a flexible conduit 24.

By particular reference to Figures 8 and 9 it will be observed that the cover plate 21 is provided with an arcuate slot having a portion 30 with the letter L above its outer end, and also having a portion 31 with the letter R above its outer end, the said arcuate slot being in communication at its center with an upwardly extending slot 32 above the upper end of which is the letter S. The movable member 22 is mounted to swing about and to be moved rectilinearly on a pin 40, and its is provided with a handle portion 41 movable in the slots alluded to and is also provided with lateral arms 42 and a downwardly extending arm 43 in which is a bifurcation 44 that receives the said pin 40.

In the neutral position of the signal 1 it will be understood that the arrows 14 will point downwardly where they will be hidden by the face plates 6. The spring 18 has a tendency to rotate the indicating members 12 in a clockwise direction from the neutral position until the arrows point to the left when the arrow will be stopped by one of the stops alluded to. This movement of the indicating members 12 under the action of the spring is permitted by the movement of the handle 46 of the control means toward the left to the outer end of the slot portion 30 which permits the wire 23 at that side of the member 22 to slacken sufficiently to permit of the movement of the indicating members through a quarter of a circle. When the handle 46 is moved back to neutral position the indicating members 12 will be turned in a reverse direction to again place the arrows in downwardly extending position. When the handle 46 is moved to the outer end of the slot portion 31, the member 22 will through one of the wires rotate the indicating members 12 until the arrow representations point to the right when movement of the indicating members 12 in said direction will be stopped by the other of the stops alluded to. On direct upward movement of the handle 46 in the slot 32, and consequent rectilinear upward movement of the member 22, the indicating members 12 will be rotated through a half of a circle whereupon the words "STOP" will be placed in view.

Manifestly it is within the purview of my invention to employ but one indicating member 12, though it will be apparent that the usefulness of the signal is enlarged by employing two indicating members 12 and two face plates, since when such provision is made the signal can be seen by persons in front of the automobile as well as by persons in rear of the automobile.

The signal may be secured on the automobile in any approved manner, and when properly made and embellished it will be appreciated that the signal is calculated to enhance rather than detract from the finished appearance of an automobile. The signal is also advantageous because the movement of the handle 46 of the control means is a natural movement, the said handle being moved toward the left when a left turn is to be indicated, and toward the right when a right turn is to be indicated. It will further be appreciated that the signal is positive in its action, and does not embody any delicate parts such as are likely to get out of order after a short period of use.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In a direction signal, the combination of a body bearing spaced letters, a face plate bearing in a position between the first-named letters a portion of the word comprising said first-named letters, and a movable indicating member interposed between the body and the face plate and constructed and arranged in one position to expose the letters on the body.

2. In a direction signal, the combination of a body bearing spaced letters, a face plate bearing in a position between the first-named letters a portion of the word comprising said first-named letters, and a movable indicating member interposed between the body and the face plate and constructed and arranged in one position to expose the letters on the body; said indicating member having on its face the representation of an arrow.

3. In a direction signal, the combination of a body bearing spaced letters, a face plate bearing in a position between the first-named letters a portion of the word comprising said first-named letters, and a movable indicating member interposed between the body and the face plate and constructed and arranged in one position to expose the letters on the body; said indicating member having on its face the representation of an arrow, with control means comprising a movable member, a connection between the indicating member and the movable member of the control means whereby the former will be moved by the latter, a spring for returning the indicating member, and a stop means to limit turning movement of the indicating member.

4. In a direction signal, the combination of a body having spaced letters on its face, a face plate bearing a portion of a word on its face, a rotary indicator mounted between the body and the face plate and notched to display the letters on the body and having an arrow on its face, a gear fixed with respect to the indicating member, a sector gear intermeshed with said gear, a spring to move the sector gear in one direction, stops complementary to the sector gear, and means for moving the sector gear against the action of the spring.

In testimony whereof I affix my signature.

FOSTER B. WOMACK.